US008270034B2

(12) United States Patent
Handa et al.

(10) Patent No.: US 8,270,034 B2
(45) Date of Patent: Sep. 18, 2012

(54) PRINTING APPARATUS FOR PRINTING A TWO-DIMENSIONAL CODE TOGETHER WITH CHARACTERS ON A MEDIUM HAVING A DESIGNATED SIZE

(75) Inventors: Yuji Handa, Tachikawa (JP); Katsuyoshi Suzuki, Akiruno (JP); Hirotaka Kuronuma, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 1290 days.

(21) Appl. No.: 11/724,505

(22) Filed: Mar. 15, 2007

(65) Prior Publication Data

US 2007/0217852 A1 Sep. 20, 2007

(30) Foreign Application Priority Data

Mar. 17, 2006 (JP) ................................ 2006-075539

(51) Int. Cl.
*H04N 1/40* (2006.01)

(52) U.S. Cl. ..................... 358/3.28; 358/1.11; 358/1.18; 400/615; 400/616; 400/615.1; 400/615.2

(58) Field of Classification Search ........................ None
See application file for complete search history.

(56) References Cited

U.S. PATENT DOCUMENTS 5,003,499 A * 3/1991 Fujiwara et al. .............. 715/246
5,230,572 A * 7/1993 Hirono et al. ..................... 400/3
5,294,202 A 3/1994 Sawada et al.
5,399,030 A * 3/1995 Niwa et al. ...................... 400/61
5,403,101 A * 4/1995 Nagase et al. .................... 400/3
5,559,934 A * 9/1996 Ogura et al. ................. 358/1.18
5,562,353 A * 10/1996 Handa et al. ............... 400/615.2
RE35,562 E * 7/1997 Hirono et al. ...................... 400/3
5,649,775 A * 7/1997 Sakuragi et al. ........... 400/615.2
(Continued)

FOREIGN PATENT DOCUMENTS

EP 0 573 305 A2 12/1993
(Continued)

OTHER PUBLICATIONS

International Search and Written Opinion of the International Searching Authority for PCT/JP2007/ 055937, dated Jul. 18, 2007. 10 Sheets.

(Continued)

*Primary Examiner* — Dung Tran
(74) *Attorney, Agent, or Firm* — Holtz, Holtz, Goodman & Chick, PC

(57) ABSTRACT

When the length of a print area in a print tape is designated and an instruction to print a symbol image of a two-dimensional code and character information is given, a printing apparatus sets the print size of the symbol image of the two-dimensional code to a predetermined print size defined as the initial setting, but changes the print attributes of the character information from the initial values to adjust the length of the character string, so that the character information can be printed together with the symbol image of the two-dimensional code within the print area in the print tape, that has the designated length. The printing apparatus prints the character information whose print size is adjusted and the symbol image of the two-dimensional code maintained at the predetermined print size, in a serial arrangement, in a range of the print tape having the designated length.

10 Claims, 10 Drawing Sheets

U.S. PATENT DOCUMENTS

| | | | | | |
|---|---|---|---|---|---|
| 5,860,752 | A * | 1/1999 | Watanabe et al. | 400/615.2 |
| 5,885,016 | A * | 3/1999 | Toyosawa et al. | 400/621 |
| 6,160,633 | A * | 12/2000 | Mori | 358/1.5 |
| 6,609,844 | B1 * | 8/2003 | Petteruti et al. | 400/88 |
| 6,857,801 | B2 * | 2/2005 | Van Bever | 400/615.2 |
| 7,278,792 | B2 * | 10/2007 | Takada et al. | 400/109.1 |
| 7,503,711 | B2 * | 3/2009 | Arkin | 400/76 |
| 7,782,479 | B2 * | 8/2010 | Handa et al. | 358/1.18 |
| 8,085,430 | B2 * | 12/2011 | Takayama | 358/1.2 |
| 8,098,408 | B2 * | 1/2012 | Sawada et al. | 358/3.28 |
| 2002/0080395 | A1 * | 6/2002 | Kurashina | 358/1.15 |
| 2006/0222429 | A1 * | 10/2006 | Kurashina | 400/76 |

FOREIGN PATENT DOCUMENTS

| | | | |
|---|---|---|---|
| JP | 01-128846 | A | 5/1989 |
| JP | 2003-109020 | A | 4/2003 |
| JP | 2003-154774 | A | 5/2003 |

OTHER PUBLICATIONS

Japanese Office Action dated Jul. 6, 2010 and English translation thereof, issued in counterpart Japanese Application No. 2006-075539.

* cited by examiner

PRINTING APPARATUS FOR PRINTING A TWO-DIMENSIONAL CODE TOGETHER WITH CHARACTERS ON A MEDIUM HAVING A DESIGNATED SIZE

BACKGROUND OF THE INVENTION

1. Field of the Invention

The present invention relates to a printing apparatus which prints first information comprising image information such as code information including a two-dimensional code, etc., and second information comprising character information, etc., on a print area having a designated size.

2. Description of the Related Art

Conventionally, a printing apparatus which prints a symbol image of a two-dimensional code together with characters on a sheet has been proposed in Unexamined Japanese Patent Application KOKAI Publication No. 2003-154774. This printing apparatus prints character information such as name, company name, address, etc. on a sheet of a name-card size, and also prints character information such as telephone number, facsimile number, URL (Uniform Resource Locator) address or e-mail address, etc. and a symbol image of a two-dimensional code embedded with encoded versions of these pieces of character information on a predetermined area of the name-card sheet, thereby to generate a name card.

This printing apparatus prints the symbol image of the two-dimensional code on the limited space of the sheet where also the pieces of character information are printed. Accordingly, the area left to be occupied by the symbol image of the two-dimensional code must become narrow, and the size of the symbol image of the two-dimensional code that can be printed becomes small. Then, as the size of the symbol image of the two-dimensional code becomes small, the amount of information that can be embedded on the symbol image is reduced. Furthermore, there might occur a problem that the information is misread when the data is read from the symbol image and decoded.

SUMMARY OF THE INVENTION

To solve the above-described problem, it is an object of the present invention to provide a printing apparatus which can print image information without reducing its print size, in a case where the image information is to be printed together with other information on a print area having a limited size.

Particularly, in a case where the image information is a symbol image of a code on which encoded character information is embedded, it is an object of the present invention to provide a printing apparatus which can perform printing by securing a required size for the symbol image, so that information of a required amount can be incorporated into the symbol image and no error may be caused in reading.

To achieve the above-objects, a printing apparatus according to the present invention comprises: a printing unit which performs printing on a print medium; a size designating unit which designates a size of a print area on which the printing unit performs printing; a print size adjusting unit which adjusts a print size of second information according to the size designated by the size designating unit, so that first information comprising image information defined to a predetermined print size, and the second information are printed in the print area having the size designated by the size designating unit; and a control unit which controls the printing unit to print the first information having the predetermined print size and the second information whose print size is adjusted by the print size adjusting unit, on the print medium.

According to the present invention, in a case where second information is to be printed together with first information comprising image information in a print area whose size is designated, the print size of the second information is adjusted according to the designation of the size of the print area so that the first information having a predetermined print size and the second information whose print size is adjusted can be contained in the size-designated print area. Therefore, the first information can be printed without being reduced in its print size. Particularly, in a case where the first information is a symbol image of code information, information of a required amount can be contained in the symbol image, and the symbol image can be printed with its size maintained at the required size, so as not to allow any reading errors to occur when the symbol image is scanned.

In a case where the first information is image information representing a symbol of a two-dimensional code or an other code, the printing apparatus may further comprise: a input unit which inputs conversion-purpose character information, which is to be converted to the image information of the symbol of the code; and a converting unit which coverts the conversion-purpose character information input from the input unit into the image information of the symbol of the code.

In the printing apparatus, in a case where the second information is character information, the print size adjusting unit may comprise a print attribute setting unit which sets print attributes including at least one of a character size, a character spacing, and a line spacing of the character information, according to the size designated by the size designating unit.

Further, in the printing apparatus, in a case where the second information is character information, the print size adjusting unit may comprise: a determining unit which determines whether or not the character information having predetermined print attributes including a predetermined character size, a predetermined character spacing, and/or a predetermined line spacing, is printable together with the first information having the predetermined print size within the print area having the size designated by the size designating unit; and a processing unit which performs a process of thinning pattern information corresponding to the character information having the predetermined print attributes, so that the character information is printed together with the first information having the predetermined print size, in a case where the determining unit determines that the character information is not printable.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1:
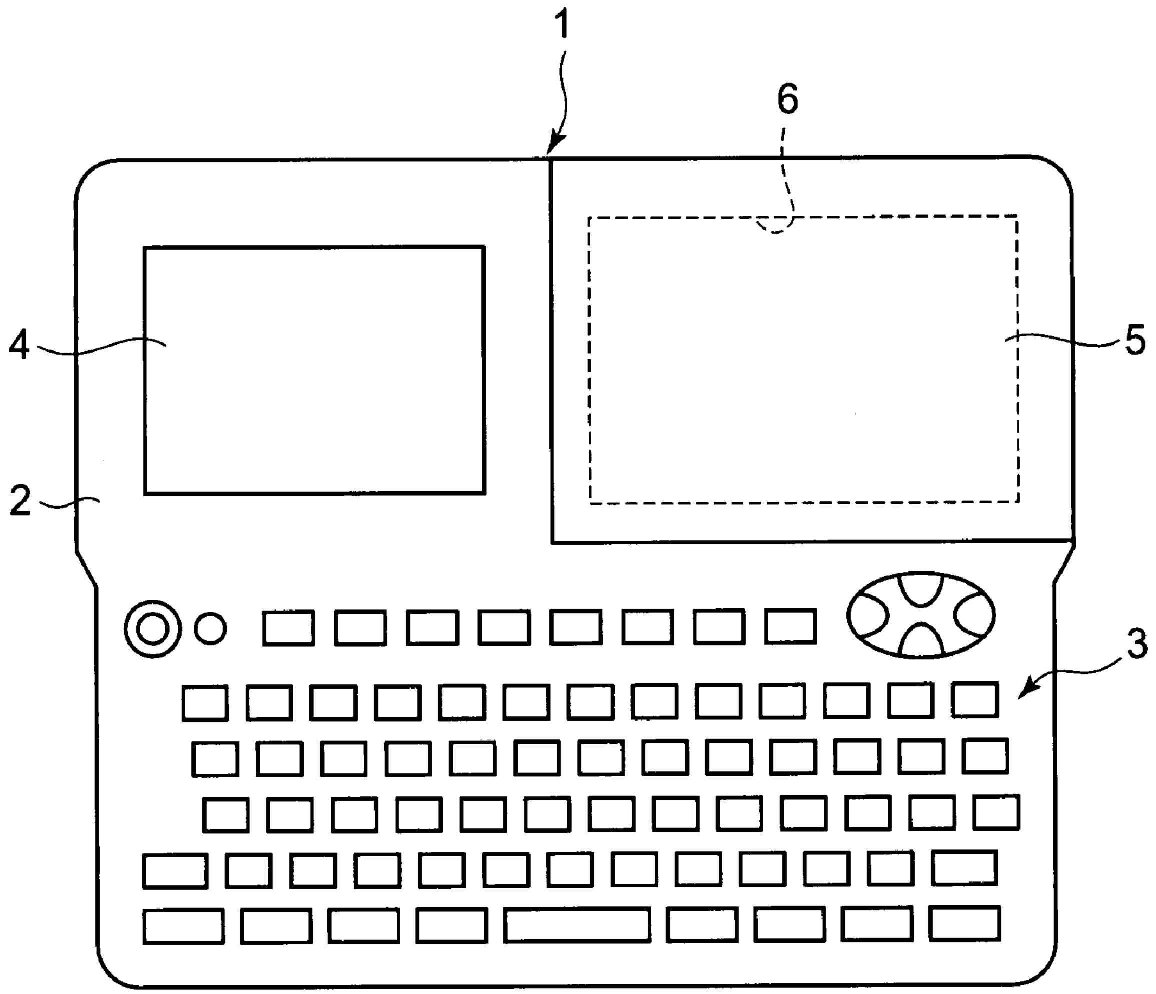
FIG. 1 is a plan view of a printing apparatus according to the embodiments of the present invention.
Figure 2:
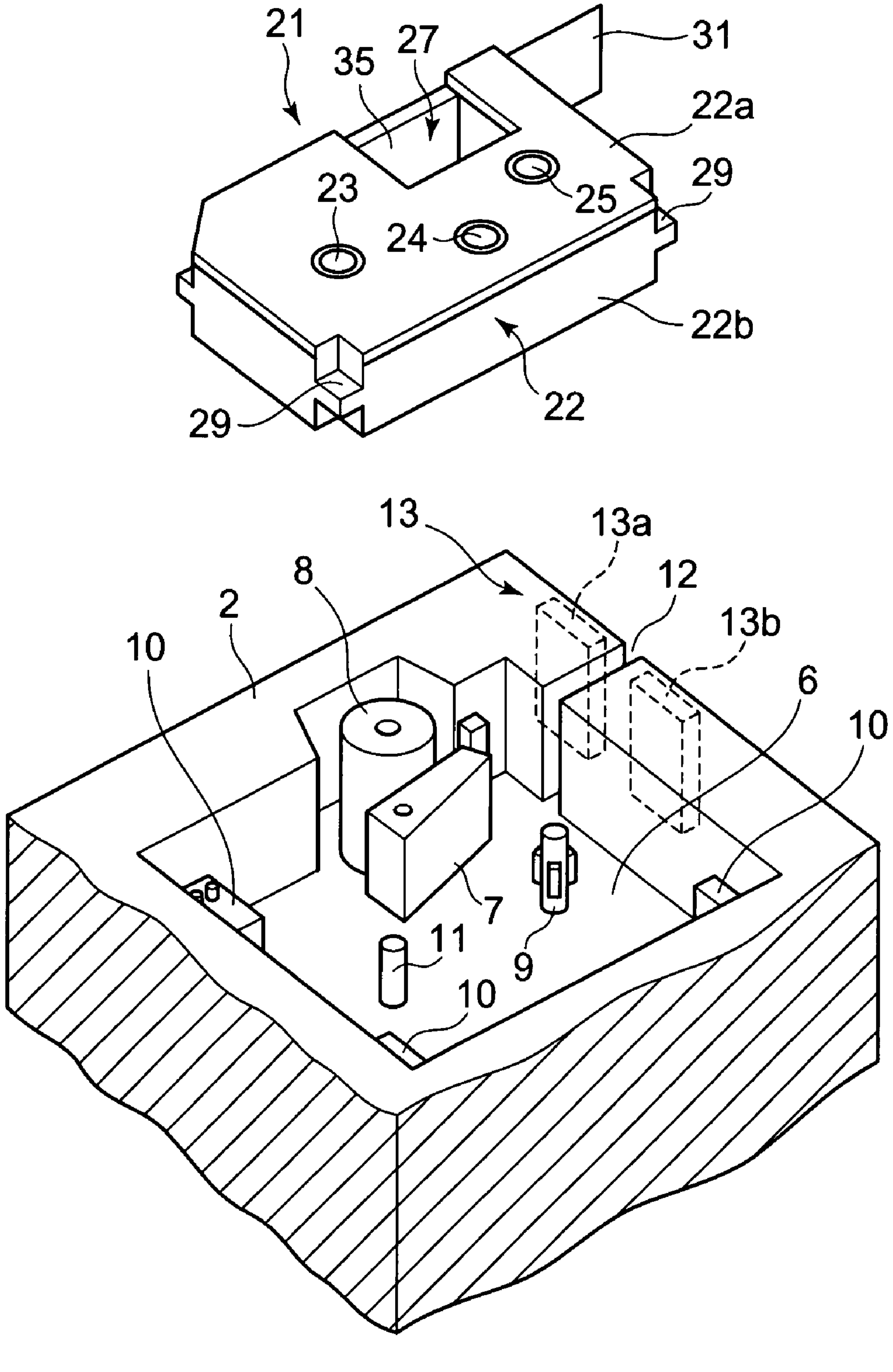
FIG. 2 is a perspective diagram of a principal part of the printing apparatus and a tape cassette.

An embodiment of the present invention will be explained with reference to the drawings. FIG. 1 is a plan view showing the appearance of a printing apparatus which performs printing on a print tape according to an embodiment of the present invention, and FIG. 2 is a perspective diagram showing the appearance of a tape cassette to be loaded in the printing apparatus, and a partial internal structure of the printing apparatus. As shown in FIG. 1 and FIG. 2, the printing apparatus 1 comprises a key input section 3, a display section 4, and an opening/closing cover 5. A cassette loading section 6, in which a tape cassette 21 containing a print tape 31 and an ink ribbon 35 is to be loaded, is formed inside the opening/closing cover 5. With the opening/closing cover 5 opened, the tape cassette 21 is detachably loaded into the cassette loading section 6.

The key input section 3 comprises character keys, a print key, a cursor key, and a control key. The character keys are for inputting data made up of characters to be printed. The print key is for instructing the start of printing. The cursor key is for moving a cursor on the display screen of the display section 4. The control key is adapted to various purposes necessary for editing processes on the input characters, setting processes of various types, print processes, etc. The display section 4 comprises a liquid crystal display device, and displays input data, selective menus for various settings, messages relating to processes, etc. The display section 4 further displays various information such as the length of a label to be generated, the status of a print mode, etc.

A print head (thermal head) 7, a platen roller 8, and a ribbon windup shaft 9 are set inside the cassette loading section 6. The thermal head 7, in which printing elements are arranged vertically, prints various information on the print tape 31. The platen roller 8 sandwiches the print tape 31 and the ink ribbon 35 with the thermal head 7 and forwards them. The ribbon windup shaft 9 winds up the used portion of the ink ribbon 35 into the tape cassette 21. Further, cassette receiving projections 10, which support the tape cassette 21 to fix it at a predetermined position, and a fitting shaft 11, which is to be fit into the tape cassette 21 to set the tape cassette 21 in place, are provided in the cassette loading section 6. A discharge opening 12, which connects to the outside of the apparatus housing 2, is formed at an end portion of the cassette loading section 6. A cutter 13 comprising a stationary blade 13*a* and a movable blade 13*b* is provided at the discharge opening 12, such that it is driven by a motor to cut the print tape 31, on which printing has been applied.

The tape cassette 21 comprises a cassette case 22 formed of an upper case 22*a* and a lower case 22*b* which are joined to each other. Contained in this cassette case 22 are a tape core 23 around which the print tape 31 is wound, a ribbon feeding core 24 around which the ink ribbon 35 unused is wound, and a ribbon windup core 25 around which the ink ribbon 35 already used for printing is wound. The print tape 31 has a stacked structure of a print tape layer on which printing is applied, an adhesive layer, and a peeling tape layer. A head mounting section 27, in which the thermal head 7 is to be mounted when the tape cassette 21 is loaded in the cassette loading section 6, is formed in the cassette case 22 of the tape cassette 21. Recessions 29, which fit with the cassette receiving projections 10 to be supported by them, are formed at the corners of the cassette case 22.

When the tape cassette 21 is loaded in the cassette loading section 6 and an instruction for the printing start is given, the print tape 31 and the ink ribbon 35 are drawn out from the tape cassette 21. With the print tape 31 and the ink ribbon 35 kept in contact with each other, they are sandwiched between the platen roller 8 and the thermal head 7 and conveyed together. Simultaneously, the thermal head 7 is driven based on print data input from the key input section 3 to generate heat, whereby the ink on the ink ribbon 35 is thermally transferred to the print tape 31 and printing is thus applied thereon. When the printing is completed, the cutter 13 is driven to separate the portion of the print tape 31 on which the printing has been applied into a label.

Figure 3:
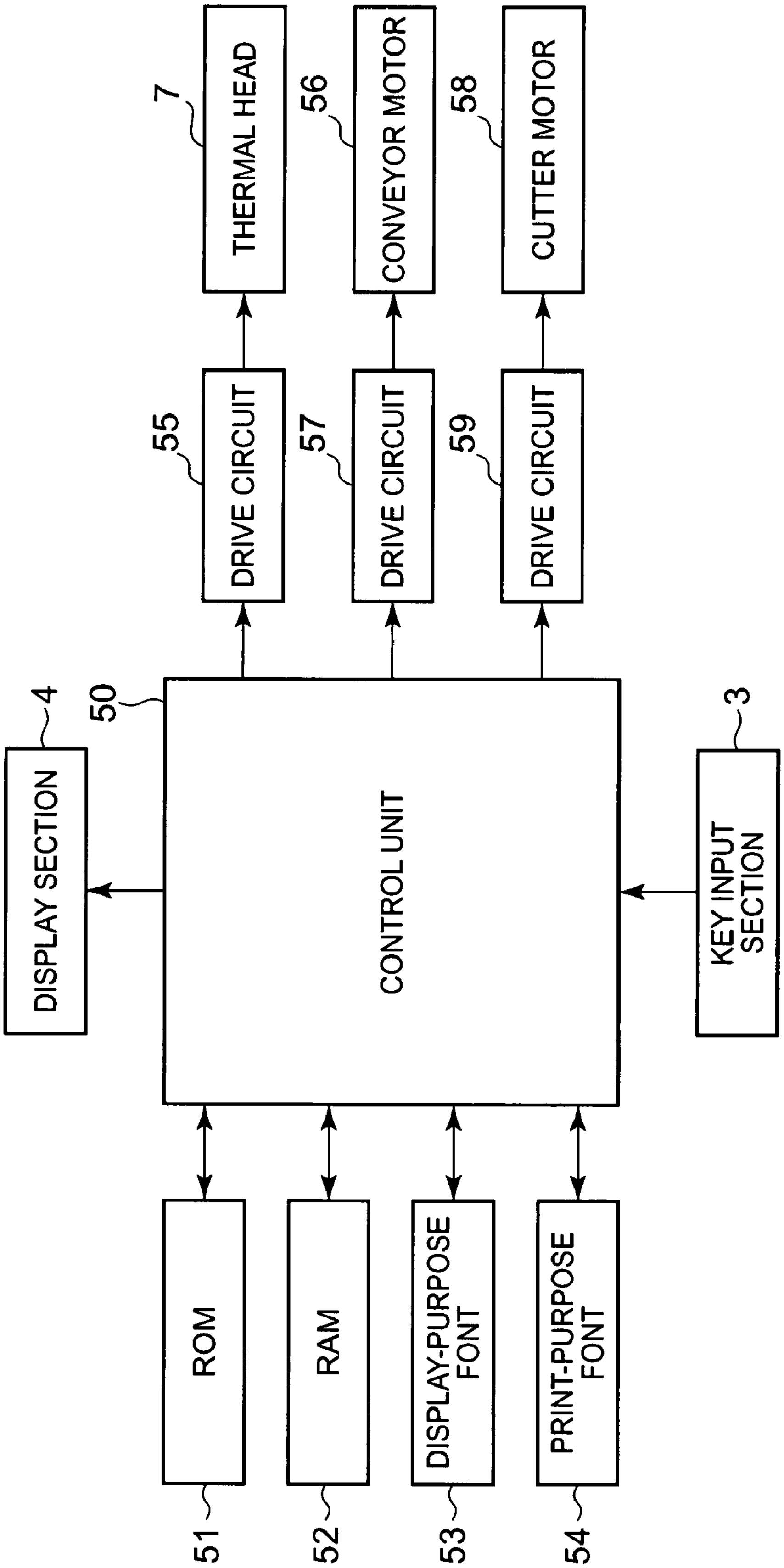
FIG. 3 is a block diagram of an electronic circuit of the printing apparatus.

FIG. 3 is a block diagram showing the structure of an electronic circuit in the printing apparatus 1. As shown in FIG. 3, the electronic circuit of this printing apparatus 1 comprises a control unit 50 constituted by a CPU (Central Processing Unit). The control unit 50 activates a system program pre-stored in a ROM (Read Only Memory) 51 in response to a key operation signal from the key input section 3, and controls the operation of each circuit element while using a RAM (Random Access Memory) 52 as a work memory. The key input section 3, the ROM 51, and the RAM 52 are connected to the control unit 50, and a display-purpose font ROM 53, a print-purpose font ROM 54, a drive circuits 55, 57, and 59, and the display section 4 are also connected to the control unit 50.

The display-purpose font ROM 53 stores character fonts for display purposes. The print-purpose font ROM 54 stores character fonts for print purposes.

The drive circuit 55 drives the thermal head 7 based on print data such that the thermal head 7 generates heat. The drive circuit 57 drives a conveyor motor 56, which comprises a stepping motor for driving the platen roller 8 and the ribbon windup shaft 9. The drive circuit 59 drives a cutter motor 58 for driving the cutter 13.

The display section 4 displays input character data, etc.

The ROM 51 stores a program for converting data input from the key input section 3 into pattern data representing a pattern of a two-dimensional code, a program for printing pattern data of a two-dimensional code and character information, and a program relating to the control on the operations of the printing apparatus 1.

In the RAM 52, areas for an input data memory, a print data memory, and a display data memory are secured. The input data memory stores data of character information input by the keys. The print data memory transforms the data of the input character information, and pattern data of a generated symbol image of a two-dimensional code, and stores these data in the transformed form. The display data memory stores pattern data to be displayed on the display section 4. A register for temporarily storing data necessary for print processes, etc., and a counter are also provided in the RAM 52.

The printing apparatus 1 according to the present invention has a predetermined print mode for generating a symbol image of a QR (Quick Response) code as a two-dimensional code, and printing the symbol image together with character information on the print tape 31 to make a label. FIGS. 5A to 5D are explanatory diagrams of print examples, showing a symbol image of a two-dimensional code and character information, which are printed on the print tape in a print process of this print mode. The printing apparatus 1 allows the operator of the apparatus 1 to designate the length of the label to be generated, i.e., the length of the print tape to be used for the label. When the operator inputs and designates the length of the print tape to be used for the label, this length is set in the printing apparatus 1 so that the symbol image of the two-dimensional code and the character information may be printed within the range of the set length. A particular feature of the present invention is that the symbol image of the two-dimensional code and the character information are printed with the size of the symbol image of the two-dimensional code kept to the predetermined size, even in a case where the designated length of the print tape is short and the print area is small.

A print process according to the aforementioned predetermined print mode will be explained below, based on a flowchart of FIG. 4 and the explanatory diagrams of the print examples of FIGS. 5A to 5D. When a print process under this print mode is started, first, a predetermined initial process of the system and a predetermined initial setting process are performed (step S1).

Figure 5A:
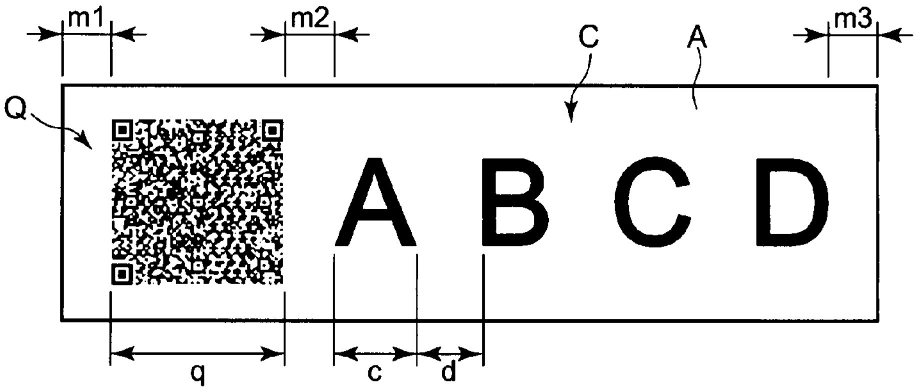
FIGS. 5A to 5D are explanatory diagrams of print examples obtained by the print process of FIG. 4.

Specifically, print attributes such as the character size, the character spacing, the line spacing, etc. of the character information to be printed, the version of the two-dimensional code, the relative arrangement between the symbol image of the two-dimensional code and the character information, and the margin size, are set to the initial values. For example, as shown in FIG. 5A, a symbol image Q of a two-dimensional code to be printed on a label A is adjusted by the initial setting to a size of q×q vertically and horizontally, by the present printing apparatus 1, which has a predetermined print resolution. The symbol image of this two-dimensional code (for example, a QR code) is made up of n×n number of cells vertically and horizontally, and the size of the symbol image is determined in the range of 21×21 cells at version 1 to 177×177 cells at version 40, at the increment of 4 cells. The larger the version is, the larger the amount of data that can be incorporated into the symbol image. In the examples of FIGS. 5A to 5D, an appropriate version that can be contained in the width of the print tape 31 is selected and set as the initial value, and the dimension of this selected version is the aforementioned size of q×q vertically and horizontally.

Further, the character size and the character spacing, among the print attributes of character information (character string) C, are set to c×c, and d, respectively, as the initial settings. An arrangement, according to which the symbol image Q and the character information C are arranged side by side serially along the direction of the length of the print tape, is set, and margins m1, m2, and m3 are set for the portion preceding the symbol image Q, the intermediate portion between the symbol image Q and the character information C, and the portion succeeding the character information C, respectively, as the initial settings. In these examples, the width of the print tape 31 has a predetermined size, which is set beforehand. As the print-purpose character size of the character information C, two character sizes, namely the character size c×c as the initial setting, and c×c/2 as the half size of that size, are prepared in the print-purpose font ROM 54. The character spacing, whose maximum value is the initial value d, is adjustable down to zero as the minimum value. The margins m1, m2, and m3 are fixed values.

After the process of step S1, an input editing screen is displayed on the display section 4, and the operator inputs character information to be converted into a two-dimensional code (step S2). When finished with inputting the character information to be converted into a two-dimensional code, the operator selects presence or absence of designation for the tape length, in order to determine the length of the label to be printed. In a case where the operator selects presence of designation for the tape length, he/she inputs his/her designated tape length L by inputting the value from the key input section 3 (step S3). This data is set in a predetermined area of the RAM 52.

Next, an input editing screen for character information to be printed together with the symbol image of the two-dimensional code is displayed on the display section 4, and the operator inputs such character information (step S4). When the input of this character information is completed, it is determined whether or not there is a designation for the tape length (step S5). In a case where there is a designation for the tape length, a first reference tape length L1 and a second reference tape length L2 are computed (step S6).

Figure 5B:
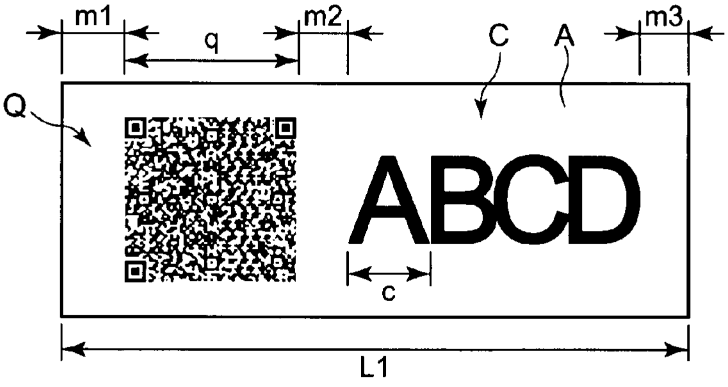

The first reference tape length L1 is a tape length (the length of the label A) of a case where the symbol image Q of the two-dimensional code at the version of the initial setting, and the character information C whose character size is the initial setting and whose character spacing is set to zero are printed together, as shown in FIG. 5B. Accordingly, if the number of characters in the character information C is n, the first reference tape length L1 is q+c×n+m1+m2+m3. The second reference tape length L2 is a tape length of a case where the symbol image Q of the two-dimensional code at the version of the initial setting, and the character information C whose character size is the smallest one (the half size of the character size of the initial setting) and whose character spacing is set to zero are printed together, as shown in FIG. 5D. Accordingly, if the umber of characters in the character information C is n, the second reference tape length L2 is q+c/2×n+m1+m2+m3. These reference tape lengths L1 and L2 are stored in a redetermined area of the RAM 52.

Next, it is determined whether or not the designated tape length L is smaller than the second reference tape length L2 (step S7). In a case where the designated tape length L is smaller than the second reference tape length L2, an error notification is given to urge a re-input of character information C that is to be printed together with the symbol image Q of the two-dimensional code (step S8). The printing apparatus 1 adjusts the print attributes of the character information C such that the symbol image Q and the character information C are contained in the designated tape length L while the size of the symbol image Q of the two-dimensional code is maintained at the initial setting. If the designated tape length L is smaller than the second reference tape length L2, it is impossible to adjust the length of the character string by setting the print attributes of the character information C to be smaller than the smallest character size and the smallest character spacing. Accordingly, the error notification is given to the operator to prompt him/her to reduce the number of input characters. On the other hand, in a case where it is determined at step S5 that there is no designation for the tape length, the processes at step S6 to S8 are skipped.

Next, when the operator operates the keys of the key input section 3 and gives an instruction to start printing (step S9), it is determined whether or not there is a designation or the tape length (step S10). In a case where there is a designation for the tape length, it is determined whether or not the designated tape length L is equal to or larger than the first reference tape length L1 (step S1).

In a case where it is determined that the designated tape length L is equal to or larger than the first reference tape length L1, the character spacing of the character information C is computed, for a case where the symbol image Q and the character information C are printed together on the print tape 31 having the designated tape length L on the conditions that the version of the symbol image Q of the two-dimensional code is adapted to the size of the initial setting, the character size of the character information C is the size of the initial setting, and the preceding, succeeding, and intermediate margins are the sizes of the initial settings (step S12). Then, the setting is changed to the computed character spacing. That is, in a case where the designated tape length L is equal to or larger than the first reference tape length L1, only the character spacing is changed and the other print attributes are maintained at the initial settings (step S13).

To the contrary, in a case where the designated tape length L is smaller than the first reference tape length L1, the character spacing of the character information C is computed, for a case where the symbol image Q and the character information C are printed together on the print tape 31 having the designated tape length L on the conditions that the version of the symbol image Q of the two-dimensional code is adapted to the size of the initial setting, the character size of the character information C is the half size of the character size of the initial setting, and the preceding, succeeding, and intermediate margins are the sizes of the initial settings (step S14). Then, the settings of the print attributes are changed to change the character size of the character information C to the half size of the size of the initial setting, and to change the character spacing to the computed value (step S15). In a case where it is determined at step S10 that there is no designation for the tape length, the print attributes are maintained at the initial settings and no changes are made to the settings of the print attributes, because there is no particular limitation on the length. In this manner, the process for correcting the settings of the print attributes according to the designated tape length L is performed. As apparent from the above explanation, the size of the symbol image Q of the two-dimensional code is maintained at the initial setting. That is, while the print size of the character information C is adjusted according to the size of the print area based on the designation of the tape length, the version of the symbol image Q of the two-dimensional code is maintained at the initial setting and the print size thereof is maintained at a predetermined print size.

After the settings of the print attributes are corrected, the character information that has been input for being converted into a two-dimensional code is converted into pattern information representing the symbol image Q of the two-dimensional code at the version of the initial setting. At the same time, in order that the pattern information of the symbol image Q and the character information C to be printed may be printed in a serial arrangement along the direction of the length of the print tape 31, the character information C to be printed is transformed into character pattern information according to the print attributes finally set. Further, in order that the character pattern information and the pattern information of the symbol image Q may be provided with the predetermined margins at the preceding, intermediate, and succeeding portions, margin pattern information is inserted at the predetermined positions. Print data is generated in this manner (processes up here, step S16). This print data is stored in a predetermined area in the RAM 52.

The thermal head 7, which is driven according to the print data, applies printing to the print tape 31, which is conveyed by the platen roller 8 (step S17). When the printing is completed, the cutter 13 cuts the print tape 13 by the designated tape length L to generate the label A (step S18).

Figure 5C:
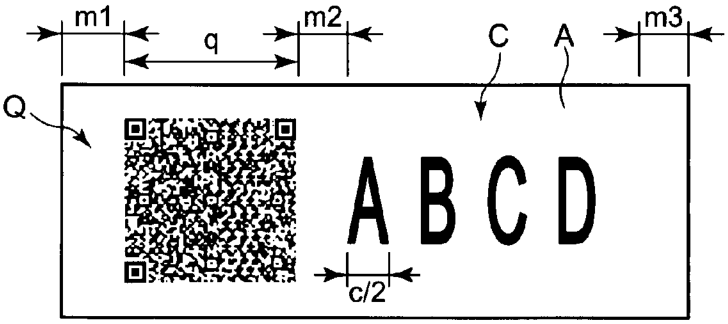
Figure 5D:
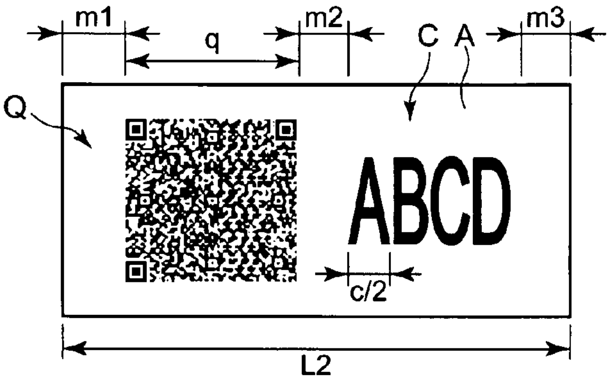

FIGS. 5A to 5D show the print examples of the cases where the settings of the character size and character spacing of the character information C are changed according to the designated tape length L while the size of the symbol image Q of the two-dimensional code is maintained at the initial setting. FIG. 5A shows a print example of a case where there is no designation for the tape length L, and the print attributes of the character information C are maintained at the initial settings. FIG. 5B shows a print example of a case where the designated tape length L is equal to the first reference tape length L1. FIG. 5D shows a print example of a case where the designated tape length L is equal to the second reference tape length L2. FIG. 5C shows a print example of a case where the designated tape length L is between the first reference tape length L1 and the second reference tape length L2.

Figure 4:
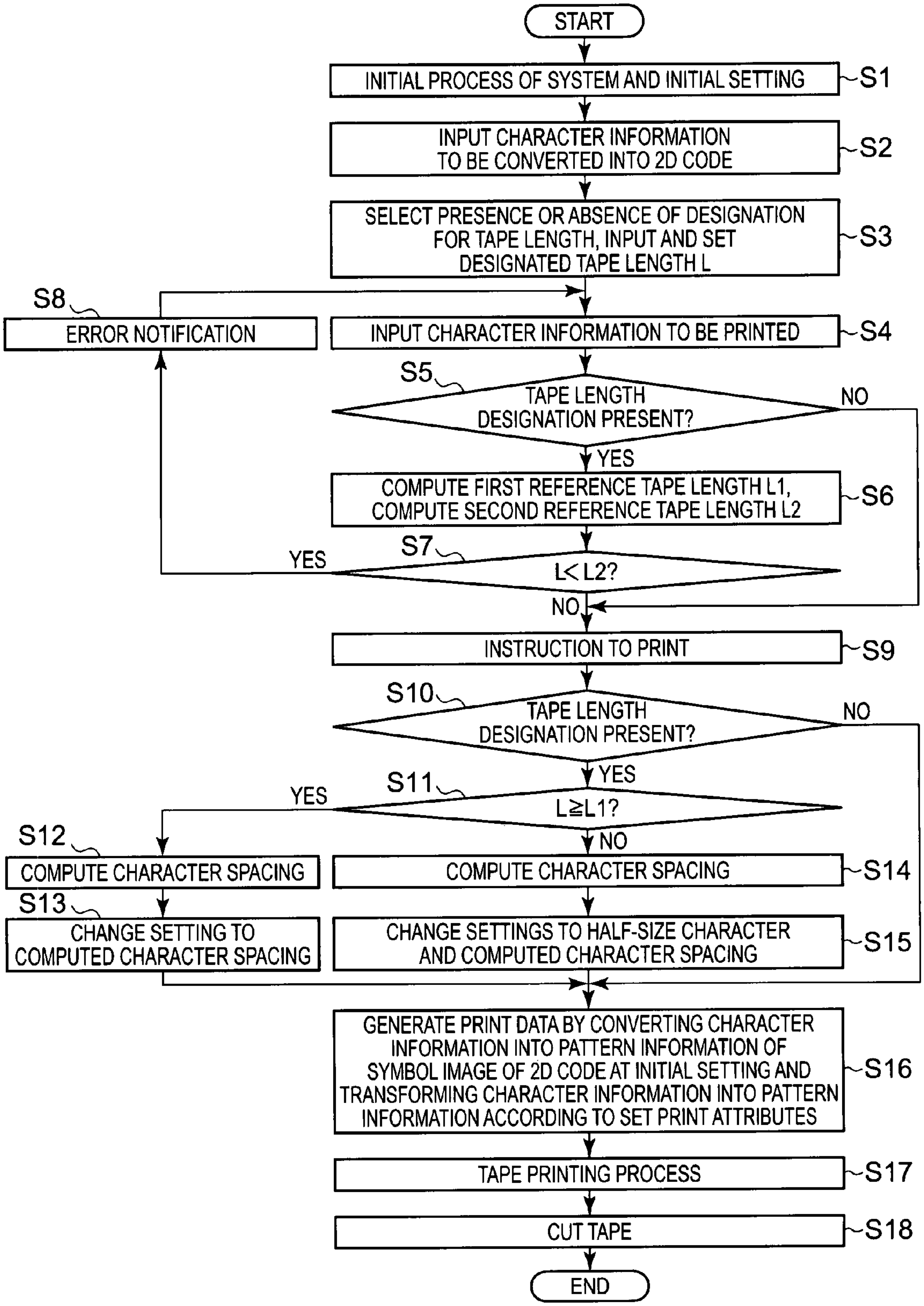
FIG. 4 is a flowchart of a print process of the printing apparatus.

As described above, according to the print process shown in the flowchart of FIG. 4, the size of the symbol image Q of the two-dimensional code is maintained at the initial setting while the print attributes of the character information C are changed from the initial values according to the designated tape length L to adjust the length of the character information C, whereby the symbol image Q of the two-dimensional code maintained at a predetermined print size and the character information C adjusted in print size can together be printed in a serial arrangement along the direction of the length of the print tape 31. That is, even if the print area becomes small according to the designation for the tape length, the print size of the symbol image Q of the two-dimensional code is not to be reduced (the print size of the symbol image Q is maintained at a predetermined print size). Therefore, information of a required amount can be contained in the symbol image Q. Furthermore, when the symbol image Q is scanned by a code reading device, reading errors are less likely to occur.

Figure 6:
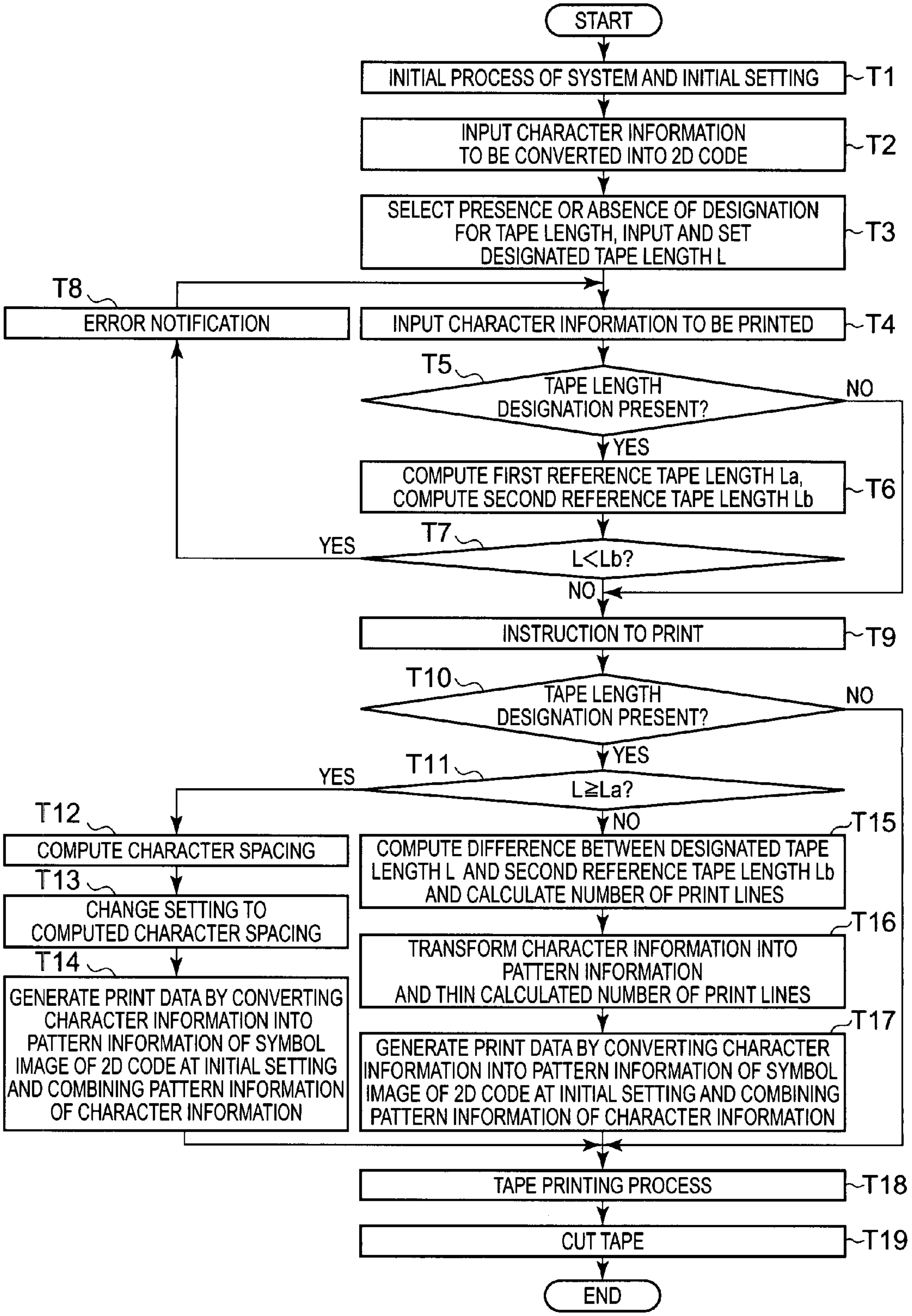
FIG. 6 is a flowchart of another print process of the printing apparatus.

Next, FIG. 6 shows a flowchart of a print process according to another embodiment. The print process of FIG. 4 is for adjusting the length of the character information C (the print size of the character information C) by changing the settings of the print attributes of the character information C according to the designated tape length L, whereas the print process of FIG. 6 is for adjusting the length of the character information C by thinning the pattern information of the character information C.

First, a predetermined initial process of the system is performed (step T1). Here, likewise in the print process of FIG. 4, print attributes such as the character size, the character spacing, etc. of character information C to be printed, the version of a two-dimensional code, the relative arrangement between the character information C and a symbol image Q, and the margins are set to the initial values. Thereafter, likewise in the print process of FIG. 4, the operator inputs character information to be converted into a two-dimensional code (step T2), the operator selects presence or absence of designation for the tape length and inputs a designated tape length L (step T3), and the operator inputs character information C to be printed together with the symbol image Q of the two-dimensional code (step T4).

Next, it is determined whether or not any tape length is designated (step T5). In a case where there is a designation for the tape length, a first reference tape length La and a second reference tape length Lb are computed (steep T6).

The first reference tape length La is a tape length (the length of a label A) of a case where the symbol image Q of the two-dimensional code and the character information C are printed together in a state that the version of the symbol image Q of the two-dimensional code is the initial setting, and the character size and character spacing of the character information C are the initial settings. Accordingly, if the number of the characters in the character information C is n, the first reference tape length La is $q+c\times n+d\times(n-1l)+m1+m2+m3$. The second reference tape length Lb is the smallest tape length that allows all the necessary information to be printed, in a case where the pattern information of the character information C is thinned by a single line or plural lines in the direction perpendicular to the direction of the length of the pattern information, at each predetermined interval in the direction of the length. This length is ½ of the length of the character information C in the printed label having the first reference tape length La. That is, if the number of characters in the character information is n, the second reference tape length Lb is $q+(c\times n+d\times(n-1))/2+m1+m2+m3$.

Since the character shapes are distorted when the thinning ratio is large, the length of the pattern information of the character information C in the second reference tape length Lb can take values that are equal to or larger than 50% of the length of the pattern information of the character information C in the first reference tape length La. These reference tape lengths La and Lb are stored in a predetermined area of the RAM 52.

Next, it is determined whether or not the designated tape length L is smaller than the second reference tape length Lb (step T7). When it is determined that the designated ape length L is smaller than the second reference tape length Lb, an error notification is given to urge a re-input of character information C to be input (step T8). In a case where it is determined at step T5 that there is no designation for the tape length, the processes at step T6 to T8 are skipped.

Next, when the operator operates the keys of the key input section 3 and gives an instruction to start printing (step T9), it is determined whether or not there is a designation for the tape length (step T10). In a case where there is a designation for the tape length, it is determined whether or not the designated tape length L is equal to or larger than the first reference tape length La (step T11). In a case where the designated tape length L is equal to or larger than the first reference tape length La, the character spacing of the character information C is computed, for a case where the symbol image Q and the character information C are printed together on the print tape 31 having the designated tape length L on the conditions that the version of the symbol image Q of the two-dimensional code is adapted to the size of the initial setting, the character size of the character information C is the size of the initial setting, and the preceding, succeeding, and intermediate margins are the sizes of the initial settings (step T12). The setting is changed to the character spacing computed (step T13). That is, in a case where the designated tape length L is equal to or larger than the first reference tape length La, only the setting of the character spacing is changed and the other print attributes are maintained at the initial settings.

Then, the character information that has been input for being converted into a two-dimensional code is converted into pattern information of the symbol image Q of the two-dimensional code at the version of the initial setting. In order that the pattern information of the symbol image Q and the character information C may be printed in a serial arrangement along the direction of the length of the print tape 31, the character information C to be printed is transformed into character pattern information according to the print attributes finally set. Further, in order that the character pattern information and the pattern information of the symbol image Q may be provided with the predetermined margins at the preceding, intermediate, and succeeding portions, margin pattern information is inserted at the predetermined positions. Print information is generated in this manner (processes up here, step T14). This print data is stored in a predetermined area of the RAM 52.

On the other hand, in a case where the designated tape length L is smaller than the first reference tape length La, the difference between the designated tape length L and the second reference tape length Lb is computed, and the length of this difference is converted into the number of print lines (step T15). The character information C is transformed into pattern information according to the print attributes of the initial settings, and data, which amount to the number of print lines computed at step T15 and which are located at equal intervals along the direction of the character string, are thinned from the pattern information transformed from the character information C (step T16).

Then, the character information that has been input for being converted into a two-dimensional code is converted into pattern information of the symbol image Q of the two-dimensional code at the version of the initial setting. At the same time, the pattern information of the symbol image Q and the pattern information of the character information C that has been thinned are combined such that they are printed serially along the direction of the length of the print tape 31. Further, in order that these pieces of pattern information may be provided with the predetermined margins at the preceding, intermediate, and succeeding portions, margin pattern information is inserted at the predetermined positions. Print data is generated in this manner (processes up here, step T17). This print data is stored in a predetermined area in the RAM 52.

Then, the thermal head 7, which is driven according to the print data generated at step T14 or step T17, applies printing to the print tape 31, which is conveyed by the platen roller 8 (step T18). When the printing is completed, the cutter 13 cuts the print tape 31 to generate the label A (step T19).

As described above, according to the print process shown in the flowchart of FIG. 6, the size of the symbol image Q of the two-dimensional code is maintained at the initial setting whereas the pattern information of the character information C is thinned according to the designated tape length L to adjust the length of the character string, whereby the symbol image Q and the character information C can together be printed in a serial arrangement along the direction of the length of the print tape 31 with the symbol image Q of the two-dimensional code maintained at a predetermined size. Accordingly, if the print area is small due to a designation for the tape length, information of a required amount can be contained in the symbol image Q of the two-dimensional code. Furthermore, errors are less likely to occur in reading the symbol image Q.

Next, a print process according to yet another embodiment will be explained based on a flowchart of FIG. 7, and explanatory diagrams of print examples shown in FIGS. 8A and 8B and FIGS. 9A and 9B. In this print process, with the use of a print tape that has a predetermined large width, a symbol image Q of a two-dimensional code and character information C are printed in a parallel arrangement, along the direction of the length of the print tape 31.

Figure 8A:
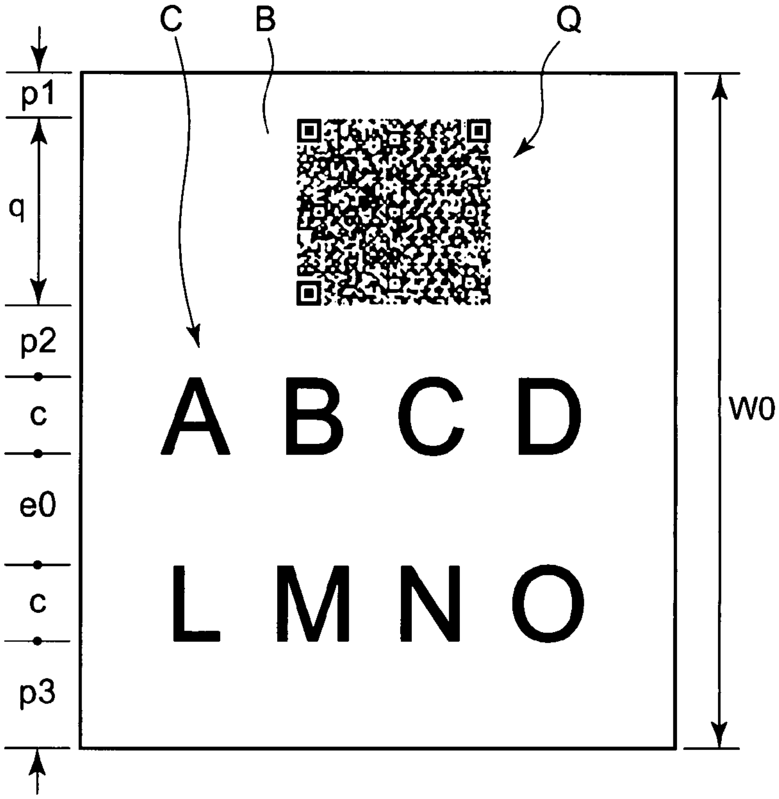
FIGS. 8A and 8B are explanatory diagrams of print examples obtained by the print process of FIG. 7.

First, a predetermined initial process of the system is performed (step U1). Here, the predetermined initial process of the system is performed, and print attributes such as the character size, the character spacing, the line spacing, etc. of character information to be printed, the version of a two-dimensional code, the relative arrangement between the character information and a symbol image, and margins are set to the initial values. For example, as shown in FIG. 8A, a symbol image Q of a two-dimensional code to be printed on a label B is initially set to a version at which the symbol image Q will have a size of q×q vertically and horizontally, by the preset printing apparatus 1 having a predetermined resolution. Further, the character size and the line spacing, among the print attributes of the character information C, are set to c×c, and e0, respectively, as the initial settings. The symbol image Q and the character information C are arranged vertically in the direction of the width of the print tape 31, and the margins at the upper portion of the symbol image Q, the intermediate portion between the symbol image Q and the character information C, and the lower portion of the character information C are set to p1, p2, and p3, respectively, as the initial settings. In this example, the width of the print tape 31 is a predetermined size, which is set beforehand, and the maximum character size of the character information C is the initial setting of c×c, while the minimum character size thereof is ¼ of that size, i.e., c/2×c/2. The maximum line spacing is the initial setting of e0, and the line spacing can be adjusted down to e1, which is the minimum. The number of lines r in the character information C and the margins p1, p2, and p3 are fixed values.

Next, an input editing screen is displayed on the display section 4, and the operator inputs character information to be converted into a two-dimensional code (step U2). When finished with inputting the character information to be converted into a two-dimensional code, the operator selects presence or absence of designation for the tape width, in order to determine the width of the label to be printed (step U3). When selecting presence of designation for the tape width, the operator inputs his/her designated tape width W by inputting the value from the key input section 3 (step U4). This data is set in a predetermined area of the RAM 52. The tape width can be designated in the range of the maximum width W0, which is equal to the width of the print tape 31, to the minimum width W2, which is determined beforehand. It is determined whether or not the designated tape width W is within this range (step U5), and an error notification is given (step U6) if it is not within the range.

Figure 8B:
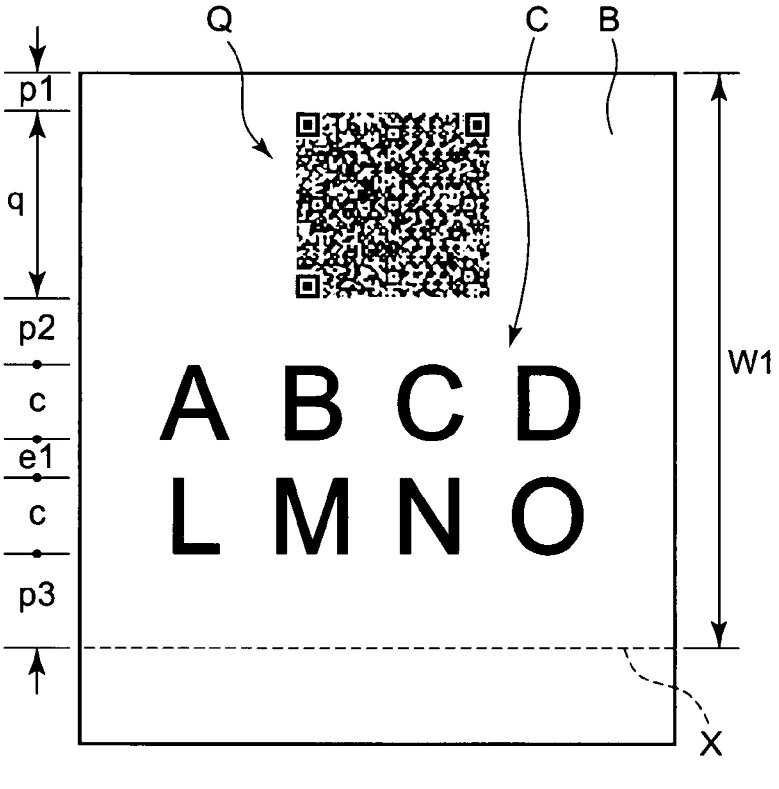

In a case where the designated tape width W is within the range, an input editing screen for character information C to be printed together with the symbol image Q of the two-dimensional code is displayed on the display section 4, ad the operator inputs such character information (step U7). Next, when the operator gives an instruction to start printing (step U8), it is determined whether or not any tape width is designated (step U9). In a case where there is a designation for the tape width, it is determined whether or not the designated tape width W is equal to or larger than a reference tape width W1 (step U10). The reference tape width W1 is a tape width of a case where the symbol image Q of the two-dimensional code and the character information C are printed together in the state that the version of the symbol image Q of the two-dimensional code is the initial setting, the character size of the character information C including the predetermined number of lines r is maintained at the initial setting, and the line spacing is set to the minimum line spacing of e1, as shown in FIG. 8B. Accordingly, the reference tape width W1 is $q+c\times r+e1\times(r-1)+p1+p2+p3$. The aforementioned minimum tape width W2 is a tape width of a case where the symbol image Q of the two-dimensional code and the character information C are printed together in a state that the size of each character in the character information C including the predetermined number of lines r is the minimum character size, i.e., ¼ of the character size of the initial setting, and the line spacing of the character information C is the minimum line spacing of e1. Accordingly, as shown in FIG. 9B, the minimum tape width W2 is $q+c/4\times r+e1\times(r-1)+p1+p2+p3$.

In a case where it is determined at step U10 that the designated tape width W is equal to or larger than the reference tape width W1, the line spacing is computed (step U11), ad the setting is changed to the line spacing computed (step U12). On the other hand, in a case where it is determined at step U10 that the designated tape width W is not equal to or larger than the reference tape width W1, this means that printing cannot be implemented on the designated tape width W if the character size is the size of the initial setting. Therefore, the line spacing is computed with the character size determined as the ¼ size (step U13), and the settings of the print attributes of the character information C are changed to the ¼ size and to the line spacing computed (step U14).

After the settings of the print attributes are changed, the character information that has been input for being converted into a two-dimensional code is converted into pattern information of the symbol image Q of the two-dimensional code at the version of the initial setting. At the same time, in order that the pattern information of the symbol image Q and the character information C to be printed may be printed in a parallel arrangement along the direction of the length of the print tape 31, the character information C to be printed is transformed into character pattern information according to the print attributes finally set. Further, in order that this character patter information and the pattern information of the symbol image Q may be provided with the predetermined margins at the upper, intermediate, and lower portions, margin pattern information is inserted at the predetermined positions. Print data is generated in this manner (processes up here, step U15). This print data is stored in a predetermined area of the RAM 52.

The thermal head 7, which is driven according to the print data, applies printing to the print tape 31, which is conveyed by the platen roller 8. At this time, a cutting line X is printed correspondingly to the designated tape width W (step U16). When the printing is completed, the cutter 13 cuts the print tape 31 by a designated tape length L to generate the label B (step U17).

Figure 9A:
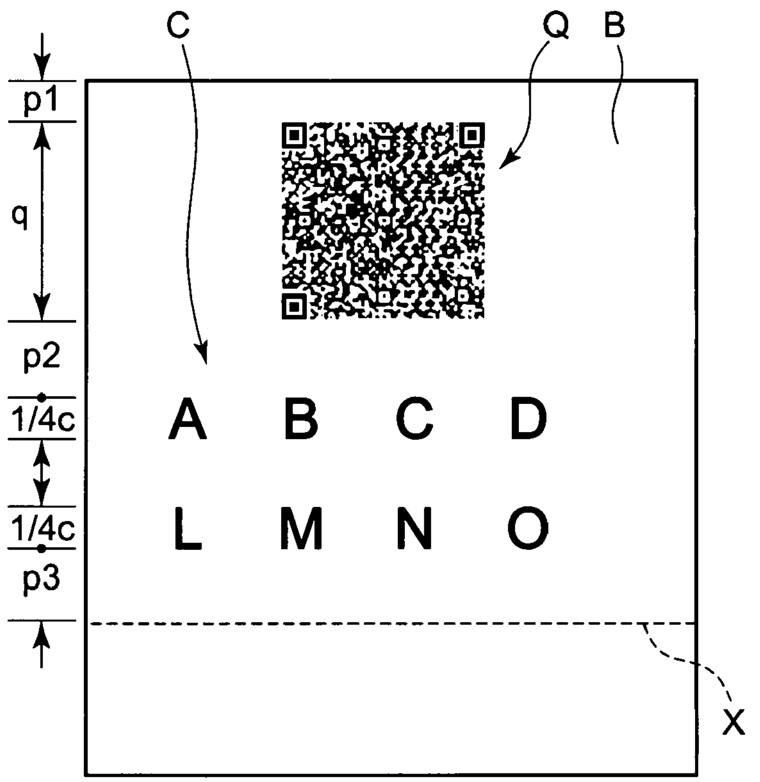
FIGS. 9A and 9B are other explanatory diagrams of print examples obtained by the print process of FIG. 7.
Figure 9B:
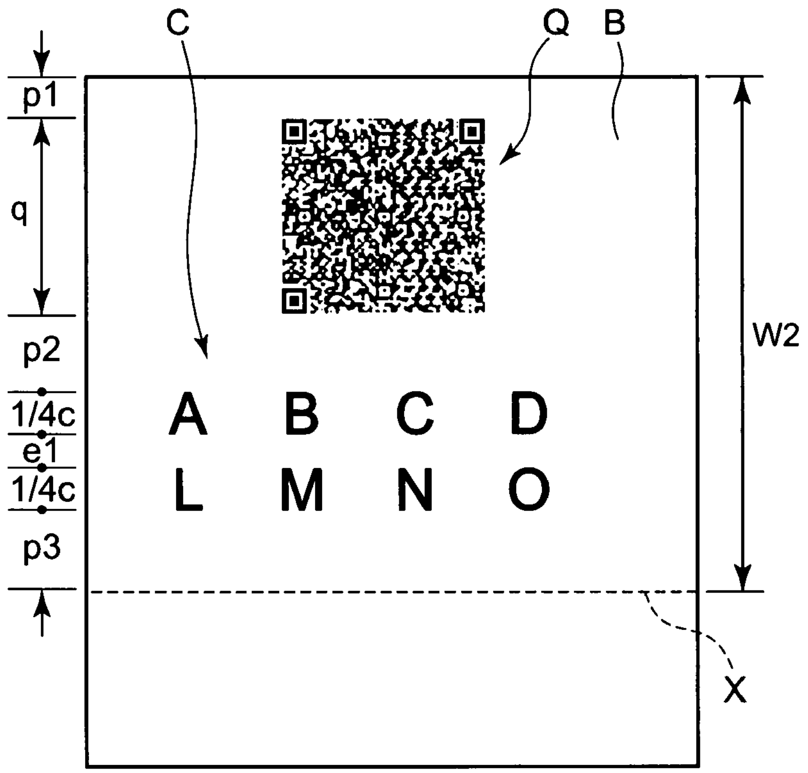

FIGS. 8A and 8B and FIGS. 9A and 9B show print examples of cases where the settings of the character size and line spacing of the character information C are changed according to the designated tape width while the size of the symbol image Q of the two-dimensional code is maintained at the initial setting. FIG. 8A shows a print example of a case where there is no designation for the tape width W and the print attributes of the character information C are maintained at the initial settings. FIG. 8B shows a print example of a case where the designated tape width W is equal to the reference tape width W1. FIG. 9B shows a case where the designated tape width W is equal to the minimum tape width W2. FIG. 9A shows a print example of a case where the designated tape width W is set between the reference tape width W1 d the minimum tape width W2.

Figure 7:
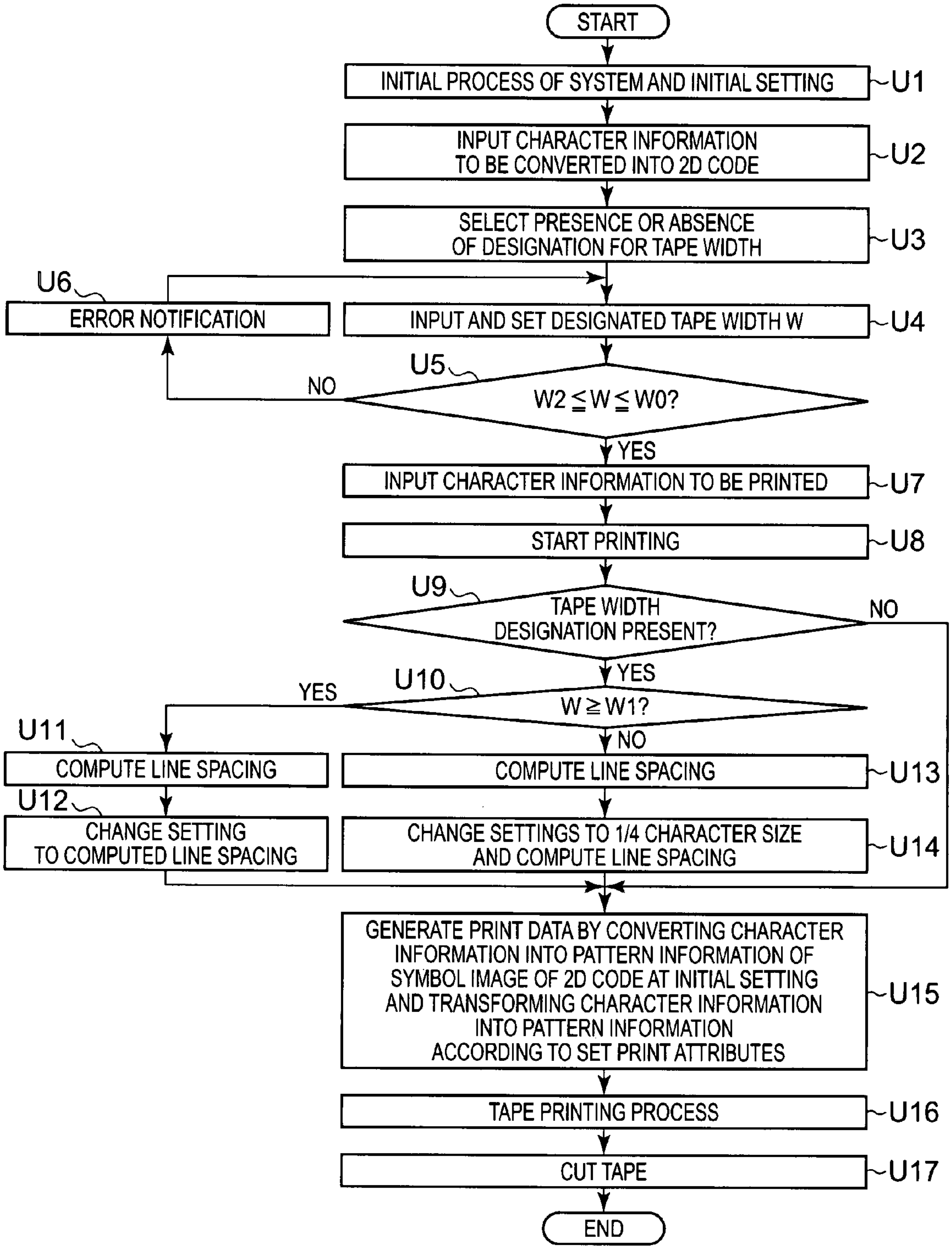
FIG. 7 is a flowchart of yet another print process of the printing apparatus.

As described above, according to the print process shown in FIG. 7, by adjusting the print attributes relating to the character information C according to the designated tape width W while maintaining the size of the symbol image Q of the two-dimensional code at the initial setting, it is possible to print the symbol image Q and the character information C together on the print tape 31 in a parallel arrangement with the symbol image Q of the two-dimensional code maintained at a predetermined print size. Accordingly, even if the print area becomes small due to a designation for the tape width, information of a required amount can be contained in the symbol image Q of the two-dimensional code, and errors are less likely to occur in reading the symbol image Q.

Figure 10:
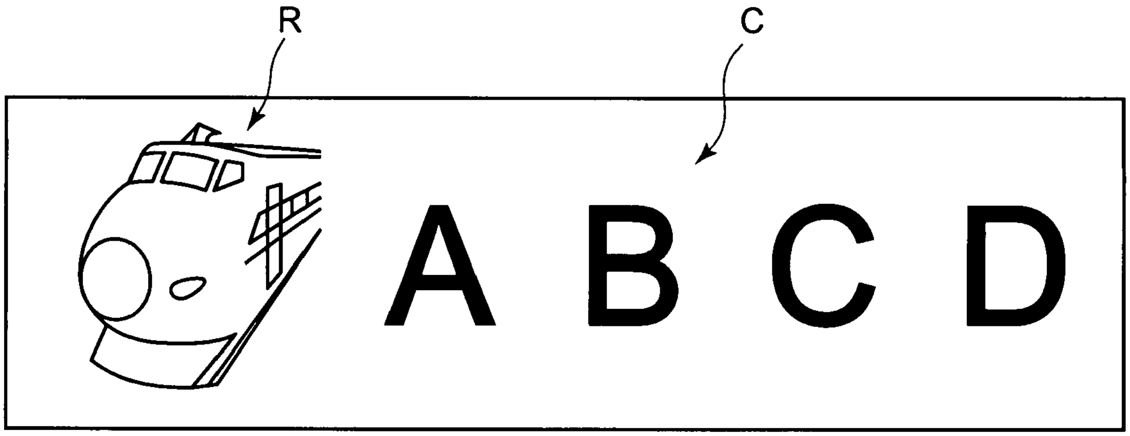
FIG. 10 is an explanatory diagram of another print example.

The present invention is for printing first information and second information on a size-designated print area, and at this time, adjusts the print size of the second information according to the designation for the size of the print area while maintaining the first information at a predetermined print size. Selectable as the first information are, for example, a symbol image of a barcode, a photo image R as shown in FIG. 10, etc., in addition to a symbol image of a two-dimensional code explained in the above-described embodiments. FIG. 10 shows an example that a photo image R as the first information and character information C as the second information are printed. Further, other information than the character information C explained in the above-described embodiments, such as image information, etc. may be selected as the second information. That is, information for which size adjustment according to a size designation for the print area is not preferred may be selected as the first information, and information which may be size-adjusted according to a size designation for the print area may be selected as the second information. The selections are at the discretion of the operator. Hence, the operator can select information of arbitrary kinds, as the first information and the second information.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-75539 filed on Mar. 17, 2006 and including specification, claims, drawings and summary. The disclosure of the above Japanese Patent Application is incorporated herein by reference in its entirety.

What is claimed is:

1. A printing apparatus, comprising:

a printing unit which performs printing on a tape-like print medium along a direction of a length thereof;

a size designating unit which designates a size of a print area on which the printing unit performs printing;

a print size adjusting unit which adjusts a print size of second information according to the size designated by the size designating unit, so that: (i) first information comprising image information which is of a symbol of a two-dimensional code and which is defined to have a predetermined print size, and (ii) the second information which is character information, are printed in the print area having the size designated by the size designating unit;

a determining unit which determines whether or not the character information having predetermined print attributes including at least one of a predetermined character size and a predetermined character spacing, is printable together with the first information having the predetermined print size within the print area having the size designated by the size designating unit, wherein the determining unit performs the determination by comparing a reference initial setting length with the print area having the size designated by the size designating unit;

a processing unit which performs a process of thinning out pattern information corresponding to the character information having the predetermined print attributes, so that the character information is printed together with the first information having the predetermined print size, when the determining unit determines that the reference initial setting length is greater than the print area having the size designated by the size designating unit;

a control unit which controls the printing unit to print the first information having the predetermined print size and the second information whose print size is adjusted by the print size adjusting unit, on the tape-like print medium;

an input unit which inputs conversion-purpose character information which is to be converted to the image information of the symbol; and a converting unit which converts the conversion-purpose character information input from the input unit into the image information of the symbol;

wherein the size designating unit designates the size of the print area in the direction of the length of the tape-like print medium;

wherein the print size adjusting unit sets at least one of a character size and a character spacing of the second information according to the size designated by the size designating unit; and wherein the control unit controls the printing unit to print the first information and the second information in a serial arrangement on the print area, along the direction of the length of the tape-like print medium.

2. The printing apparatus according to claim 1, wherein the size designating unit comprises a tape length designating unit which designates the size of the tape-like print medium in the direction of its length, and the processing unit thins the pattern information of the character information at predetermined intervals along the direction of the length of the tape-like print medium.

3. The printing apparatus according to claim 1, wherein the symbol of the two-dimensional code corresponds to a Quick Response code.

4. The printing apparatus according to claim 3, wherein the Quick Response code is embedded with an encoded version of the character information, and is scannable by a code reading device to electronically read said encoded information.

5. The printing apparatus according to claim 1, wherein the reference initial setting length is computed as a tape length of a case when the symbol of the two-dimensional code and the character information are printed together in a state in which the symbol image of the two-dimensional code has the predetermined print size, and the character size and the character spacing of the character information are at an initial setting.

6. A printing apparatus, comprising:

a printing unit which performs printing on a tape-like print medium along a direction of a length thereof;

a size designating unit which designates a size of a print area on which the printing unit performs printing;

a print size adjusting unit which adjusts a print size of second information according to the size designated by the size designating unit, so that: (i) first information comprising image information which is of a symbol of a two-dimensional code and which is defined to have a predetermined print size, and (ii) the second information which is character information, are printed in the print area having the size designated by the size designating unit;

a determining unit which determines whether or not the character information having predetermined print attributes including at least one of a predetermined character size and a predetermined line spacing, is printable together with the first information having the predetermined print size within the print area having the size designated by the size designating unit, wherein the determining unit performs the determination by comparing an initial setting width with the print area having the size designated by the size designating unit;

a processing unit which performs a process of thinning out pattern information corresponding to the character information having the predetermined print attributes, so that the character information is printed together with the first information having the predetermined print size, when the determining unit determines that the initial setting width is greater than the print area having the size designated by the size designating unit;

a control unit which controls the printing unit to print the first information having the predetermined print size and the second information whose print size is adjusted by the print size adjusting unit, on the tape-like print medium;

an input unit which inputs conversion-purpose character information which is to be converted to the image information of the symbol; and a converting unit which converts the conversion-purpose character information input from the input unit into the image information of the symbol;

wherein the size designating unit designates the size of the print area in a direction of a width of the tape-like print medium;

wherein the print size adjusting unit sets at least one of a character size and a line spacing of the second information, according to the size designated by the size designating unit; and wherein the control unit controls the printing unit to print the first information and the second information in a parallel arrangement on the print area, such that the first information and the second information are arranged in the direction of the width of the tape-like print medium.

7. The printing apparatus according to claim 6, wherein the size designating unit comprises a tape width designating unit which designates the size of the tape-like print medium to be printed by the printing unit in the direction of the width of the tape-like print medium, and the processing unit thins the pattern information of the character information at predetermined intervals along the direction of the width of the tape-like print medium.

8. The printing apparatus according to claim 6, wherein the symbol of the two-dimensional code corresponds to a Quick Response code.

9. The printing apparatus according to claim 8, wherein the Quick Response code is embedded with an encoded version of the character information, and is scannable by a code reading device to electronically read the encoded information.

10. The printing apparatus according to claim 6, wherein the initial setting width is a tape width of a case when the symbol of the two-dimensional code and the character information are printed together in a state in which the symbol image of the two-dimensional code has the predetermined print size, and the character size and the line spacing of the character information are at an initial setting.

* * * * *